US011828828B2

(12) United States Patent
Lu et al.

(10) Patent No.: US 11,828,828 B2
(45) Date of Patent: Nov. 28, 2023

(54) METHOD, APPARATUS, AND SYSTEM FOR VIBRATION MEASUREMENT FOR SENSOR BRACKET AND MOVABLE DEVICE

(71) Applicant: Beijing Tusen Zhitu Technology Co., Ltd., Beijing (CN)

(72) Inventors: Jian Lu, Beijing (CN); Pingyuan Ji, Beijing (CN); Haiquan Li, Beijing (CN); Jianan Hao, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 327 days.

(21) Appl. No.: 17/079,113

(22) Filed: Oct. 23, 2020

(65) Prior Publication Data

US 2021/0124051 A1 Apr. 29, 2021

(30) Foreign Application Priority Data

Oct. 23, 2019 (CN) .......................... 201911011742.3

(51) Int. Cl.
*G01S 17/50* (2006.01)
*G01S 17/88* (2006.01)
*H04N 23/54* (2023.01)

(52) U.S. Cl.
CPC .............. *G01S 17/50* (2013.01); *G01S 17/88* (2013.01); *H04N 23/54* (2023.01)

(58) Field of Classification Search
CPC .......... G01S 17/50; G01S 17/88; H04N 23/54
See application file for complete search history.

(56) References Cited

U.S. PATENT DOCUMENTS

2019/0033147 A1* 1/2019 Zerwekh ................... G01P 3/36
2020/0074675 A1* 3/2020 Cejka .................... G03B 17/561
2020/0342627 A1* 10/2020 Wang .................... B64C 39/024

FOREIGN PATENT DOCUMENTS

CN 101387546 A 3/2009
CN 102322938 A 1/2012
(Continued)

OTHER PUBLICATIONS

Lei Jing-fa, et al. "A Measurement Method of Plane Angle Based on Machine Vision," Journal of South China University of Technology, Natural Science Edition, vol. 39, No. 8, Aug. 2022, pp. 1-6.
(Continued)

*Primary Examiner* — Clayton E. LaBalle
*Assistant Examiner* — Diana Hancock
(74) *Attorney, Agent, or Firm* — Perkins Coie LLP

(57) ABSTRACT

The present disclosure relates to sensor technology, and provides a method, an apparatus, and a system for vibration measurement for a sensor bracket as well as a movable device. The method is applied in a system for vibration measurement for the sensor bracket. The system includes the sensor bracket to be measured that is mounted on a movable device, and a marker on the sensor bracket to be measured, and a first sensor provided on the sensor bracket to be measured for collecting marker information. The method includes: collecting the marker information of the marker on the sensor bracket to be measured using the first sensor; determining a vibration measurement reference point based on the marker information, and obtaining vibration condition data of the vibration measurement reference point; and determining a vibration evaluation result for the sensor bracket based on the vibration condition data of the vibration measurement reference point.

20 Claims, 10 Drawing Sheets

(56) References Cited

FOREIGN PATENT DOCUMENTS

| | | | | |
|---|---|---|---|---|
| CN | 106017839 A | | 10/2016 | |
| CN | 106780609 A | | 5/2017 | |
| CN | 107168398 A | | 9/2017 | |
| CN | 107449578 A | | 12/2017 | |
| CN | 109204160 A | * | 1/2019 | ........... B60Q 1/0023 |
| CN | 109313811 B | * | 11/2021 | ............... G06T 7/00 |
| KR | 20160096000 A | * | 8/2016 | ........... G01B 11/272 |

OTHER PUBLICATIONS

Zhu, Fang-wen, et al. "An AR Tracker Based on Planar Marker," Journal of Shanghai University, Natural Science, vol. 10, No. 5, Oct. 2004, pp. 1-5.

Yuanwen, Wang, et al. "Influence of sensor vibration on torsional vibration measurement and its elimination method," Journal of Vibration, Measurement & Diagnosis, Vibration Testing and Diagnosis, vol. 37, No. 5, Oct. 2017, pp. 1-7.

Xu Chao, et al. "Machine Vision Based Vibration Displacement Measurement of Large Flexible Structures," Journal of Vibration, Measurement & Diagnosis, vol. 37, No. Aug. 4, 2017, pp. 1-7.

Zhang, Wei, et al. "Marker of Monocular Vision Based on Surgical Navigation System," China Digital Medicine, vol. 11, No. 10, pp. 57-59 (Nov. 10, 2016).

No Author. "Research on low frequency vibration of large structures based on video tracking," China Academic Journal Electronic Publishing House. 2018. pp. 1-7.

Shu, Xinwei, et al. "The measurement of low frequency vibration based on stereo vision," Optical Instruments, vol. 38, No. 2, Apr. 2016, pp. 1-6.

Ma, Tianbing, et al. "Vibration displacement measurement of flexible manipulator using machine vision," vol. 36 (13) 2018, pp. 1-6.

Xu Xiuxiu et al. "Vibration measurement of Flexible beam based on machine vision," J. Huazhong University of Science & Technology, Natural Science Edition, vol. 41, Sup. I, Oct. 2013, pp. 1-4.

No Author. Chinese Application No. 201911011742.3 First Office Action, dated Nov. 2, 2022, pp. 1-25.

English translation of Chinese Office Action from corresponding Chinese Patent Application No. 201911011742.3, dated May 16, 2023, (34 pages).

Chinese Patent Office, Notice of Rejection for CN Appl. 201911011742.3, dated Sep. 28, 2023, 19 pages with English translation.

* cited by examiner

Measurement Results for Sensor Bracket to be Measured Made of Aluminum Profile 6060 Material

METHOD, APPARATUS, AND SYSTEM FOR VIBRATION MEASUREMENT FOR SENSOR BRACKET AND MOVABLE DEVICE

The present disclosure claims priority to Chinese Patent Application No. 201911011742.3, titled "METHOD, APPARATUS, AND SYSTEM FOR VIBRATION MEASUREMENT FOR SENSOR BRACKET AND MOVABLE DEVICE", filed on Oct. 23, 2019, the content of which is incorporated herein by reference in its entirety.

TECHNICAL FIELD

The present disclosure relates to sensor technology, and more particularly, to a method, an apparatus, and a system for vibration measurement for a sensor bracket as well as a movable device.

BACKGROUND

Currently, with the development of technologies such as assisted driving, autonomous driving, drones, and intelligent robots that rely on sensors (such as cameras, laser radars, etc.), requirements for data collection accuracy of sensors have become increasingly higher. On some movable devices (such as automobiles, drones, logistics robots, etc.), in order to maintain the stability of sensors' poses, a sensor bracket is typically provided to connect various sensors to a movable device fixedly. As shown in FIG. 1, taking a vehicle as an example, a sensor bracket 11 is provided on the top of the vehicle 10, and various sensors (cameras 12 as shown in FIG. 1) are fixedly mounted on the sensor bracket 11. The sensor bracket's material, manufacture process, and mounting condition on the movable device will affect vibration condition of the sensor bracket, and in turn, affect the data collection accuracy of the sensors on the sensor bracket. Therefore, it is particularly important to measure vibration of the sensor bracket.

SUMMARY

The embodiments of the present disclosure provide a method, an apparatus, and a system for vibration measurement for a sensor bracket as well as a movable device, capable of measuring vibration of the sensor bracket.

In order to achieve the above object, the present disclosure provides the following technical solutions.

In a first aspect of the embodiments of the present disclosure, a method for vibration measurement for a sensor bracket is provided. The method is applied in a system for vibration measurement for the sensor bracket. The system includes the sensor bracket to be measured that is mounted on a movable device, and a marker on the sensor bracket to be measured, and a first sensor provided on the sensor bracket to be measured for collecting marker information. The method includes: collecting the marker information of the marker on the sensor bracket to be measured using the first sensor; determining a vibration measurement reference point based on the marker information, and obtaining vibration condition data of the vibration measurement reference point; and determining a vibration evaluation result for the sensor bracket based on the vibration condition data of the vibration measurement reference point.

In a second aspect of the present disclosure, an apparatus for vibration measurement for a sensor bracket is provided. The apparatus is applied in a system for vibration measurement for the sensor bracket. The system includes the sensor bracket to be measured that is mounted on a movable device, and a marker on the sensor bracket to be measured, and a first sensor provided on the sensor bracket to be measured for collecting marker information. The apparatus is operative to perform the method for vibration measurement for the sensor bracket according to the above first aspect.

In a third aspect of the present disclosure, a system for vibration measurement for a sensor bracket is provided. The system includes an apparatus for vibration measurement for the sensor bracket, the sensor bracket to be measured that is mounted on a movable device, and a marker on the sensor bracket to be measured, and a first sensor provided on the sensor bracket to be measured for collecting marker information. The first sensor is communicatively connected to the apparatus for vibration measurement for the sensor bracket. The apparatus for vibration measurement for the sensor bracket is configured to: collect the marker information of the marker on the sensor bracket to be measured using the first sensor; determine a vibration measurement reference point based on the marker information, and obtain vibration condition data of the vibration measurement reference point; and determine a vibration evaluation result for the sensor bracket based on the vibration condition data of the vibration measurement reference point.

In a fourth aspect of the present disclosure, a movable device is provided. The movable device includes the system for vibration measurement for a sensor bracket according to the above third aspect.

In a fifth aspect of the present disclosure, a computer readable storage medium is provided. The computer readable storage medium includes a program or instructions which, when executed on a computer, cause the computer to perform the method for vibration measurement for a sensor bracket according to the above first aspect.

In a sixth aspect of the present disclosure, a computer program product is provided. The computer program product includes instructions. The computer program product, when executed on a computer, causes the computer to perform the method for vibration measurement for a sensor bracket according to the above first aspect.

In a seventh aspect of the present disclosure, a chip system is provided. The chip system includes a processor. The processor is coupled to a memory storing program instructions which, when executed by the processor, cause the processor to perform the method for vibration measurement for a sensor bracket according to the above first aspect.

In an eighth aspect of the present disclosure, a circuit system is provided. The circuit system includes a processing circuit configured to perform the method for vibration measurement for a sensor bracket according to the above first aspect.

In a ninth aspect of the present disclosure, a computer server is provided. The computer server includes a memory and one or more processors communicatively connected to the memory. The memory stores instructions executable by the one or more processors. The instructions, when executed by the one or more processors, cause the one or more processors to perform the method for vibration measurement for a sensor bracket according to the above first aspect.

The embodiments of the present disclosure provide a method, an apparatus, and a system for vibration measurement for a sensor bracket as well as a movable device. A marker and a first sensor for collecting marker information are arranged on the sensor bracket to be measured. In this way, the marker information of the marker on the sensor bracket to be measured can be collected using the first sensor. A vibration measurement reference point can be determined based on the marker information, and vibration condition data of the vibration measurement reference point can be obtained. Then, a vibration evaluation result for the sensor bracket can be determined based on the vibration condition data of the vibration measurement reference point. It can be seen that the embodiments of the present disclosure can collect the marker information using the sensor, so as to determine the vibration evaluation result for the sensor bracket as an observation result for the sensor, which can reflect the vibration condition of the sensor bracket more intuitively. On the other hand, if the vibration condition of the sensor bracket is collected using an IMU, it requires two integrations of acceleration data obtained by the IMU, and the resulting noise would significantly affect the vibration evaluation result.

BRIEF DESCRIPTION OF THE DRAWINGS

In order to describe the technical solutions according to the embodiments of the present disclosure or the prior art more clearly, figures used in description of the embodiments or the prior art will be introduced briefly below. Obviously, the figures described below only illustrate some embodiments of the present disclosure, and other figures can be obtained by those of ordinary skill in the art based on these drawings without any inventive efforts.

DETAILED DESCRIPTION OF THE EMBODIMENTS

Figure 1:
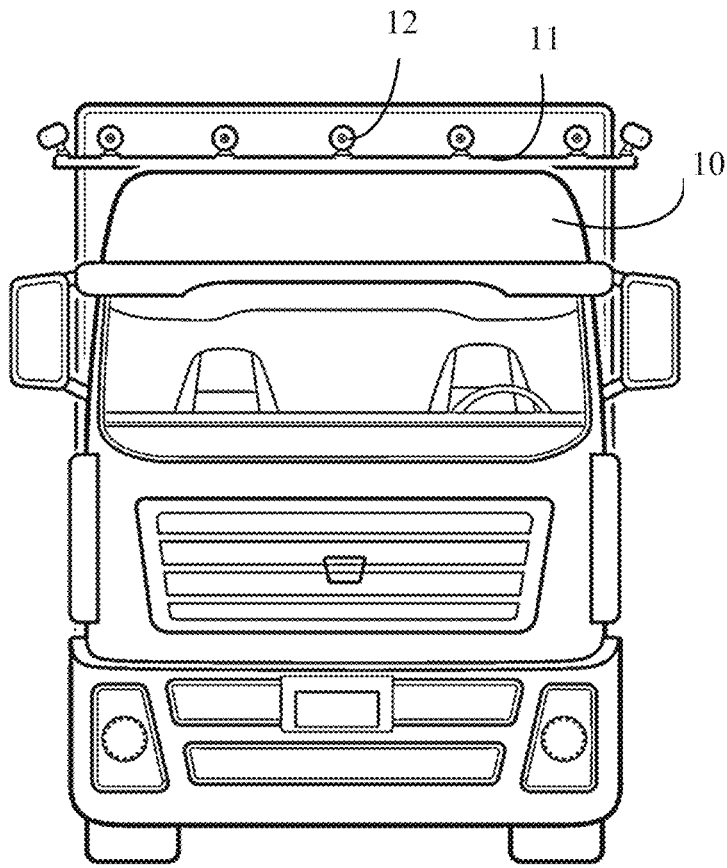
FIG. 1 is a schematic diagram showing a structure of a sensor bracket on a top of a vehicle.

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

It is to be noted that the movable device as used in the embodiments of the present disclosure can be referred to as a vehicle. The term "vehicle" is to be broadly interpreted in the present disclosure as including any moving objects, including for example aircraft, ships, spacecrafts, cars, trucks, vans, semi-trailers, motorcycles, golf carts, off-road vehicles, warehouse transport vehicles, agricultural vehicles, and vehicles running on tracks, such as trams or trains and other rail vehicles. A "vehicle" as used in the present disclosure may typically include: a power system, a sensor system, a control system, peripheral devices and a computer system. In other embodiments, a vehicle may include more, fewer, or different systems.

Here, the power system is a system that supplies power to the vehicle, including: an engine/motor, a transmission, wheels/tyres, and a power source unit.

The control system may include a combination of devices that control the vehicle and its components, such as a steering unit, a throttle, and a brake unit.

The peripheral devices may be devices that allow the vehicle to interact with external sensors, other vehicles, external computing devices, and/or users, including e.g., a wireless communication system, a touch screen, a microphone, and/or a speaker.

The vehicle described above, for example, an autonomous vehicle, can be further provided with a sensor system and an autonomous control device.

The sensor system may include a plurality of sensors for sensing information on an environment in which the vehicle is located, and one or more actuators that change respective positions and/or directions of the sensors. The sensor system may include any combination of sensors such as a Global Positioning System (GPS) sensor, an Inertial Measurement Unit (IMU), a Radio Detection and Ranging (RADAR) unit, a camera, a laser rangefinder, a Light Detection and Ranging (LIDAR) unit, and/or an acoustic sensor. The sensor system may further include sensors that monitor the vehicle's internal systems (such as an $O_2$ monitor, a fuel gauge, an engine thermometer, etc.).

The autonomous control device may include a processor and a memory having at least one machine executable instruction stored therein. The processor executes the at least one machine executable instruction to provide functions including e.g., a map engine, a positioning module, a perception module, a navigation or route module, and an autonomous control module. The map engine and the positioning module are configured to provide map information and positioning information. The perception module is configured to perceive objects in the environment around the vehicle based on information obtained by the sensor system and the map information provided by the map engine. The navigation or route module is configured to plan a driving route for the vehicle based on processing results from the map engine, the positioning module and the perception module. The autonomous control module is configured to convert decision information inputted from the modules such as the navigation or route module into a control command for outputting to a vehicle control system, and transmit the control command to respective components in the vehicle control system over an in-vehicle network (for example, an in-vehicle electronic network system implemented using a CAN bus, a local interconnection network, a multimedia directional system transmission, etc.) for autonomous control of the vehicle. The autonomous control module can also obtain information on respective components in the vehicle via the in-vehicle network.

In order to allow those skilled in the art to better understand the present disclosure, the technical terms used in the embodiments of the present disclosure are explained as follows:

IMU: Inertial Measurement Unit, having a three-axis gyroscope (for measuring a three-axis deflection angle) and a three-axis accelerometer (used to measure the three-axis acceleration) provided therein.

GNSS: Global Navigation Satellite System.

GPS: Global Positioning System.

MEMS: Micro-Electro-Mechanical System, referring to a MEMS inertial device in an embodiment of the present disclosure.

Pose: a generic term for position and posture, having 6 degrees of freedom, including 3 degrees of freedom for position and 3 degrees of freedom for orientation (the three degrees of freedom for orientation are usually represented by pitch, roll, and yaw).

OpenCV: Open Source Computer Vision Library, an open source computer vision library that can run on Linux, Windows, Android, and Mac OS operating systems. It is lightweight and efficient in that it consists of a series of C functions and a small number of C++ classes. It also provides interfaces to languages such as Python, Ruby, and MATLAB, and implements many common algorithms in image processing and computer vision.

ArUco: an open source miniature reality augmentation library, currently integrated in OpenCV3.0 and later versions. In addition to reality augmentation, it can also be used to implement some machine vision applications. An ArUco code is a binary square mark, which consists of a wide black frame and an internal binary matrix. The internal matrix determines their identification (id). The black frame facilitates quickly detection of the image, and the binary code can be used to verify the id and can enable application of error detection and correction techniques.

In the process of implementing the embodiments of the present disclosure, the inventors found that the purpose of vibration measurement for the sensor bracket is to determine the stability of the sensor on the sensor bracket. Therefore, typically an IMU can be placed at a position where the sensor is mounted on the sensor bracket, so as to obtain acceleration and speed information for the position where the sensor is mounted from the IMU, thereby obtaining a vibration effect for the position where the sensor is mounted by means of data processing. However, the vibration effect is determined by placing the IMU at the position where the sensor is mounted. Due to high noise in the IMU data processing, the vibration effect obtained by the IMU has low accuracy as it is difficult to determine whether the vibration effect is caused by the vibration itself or by the data noise.

Figure 2:
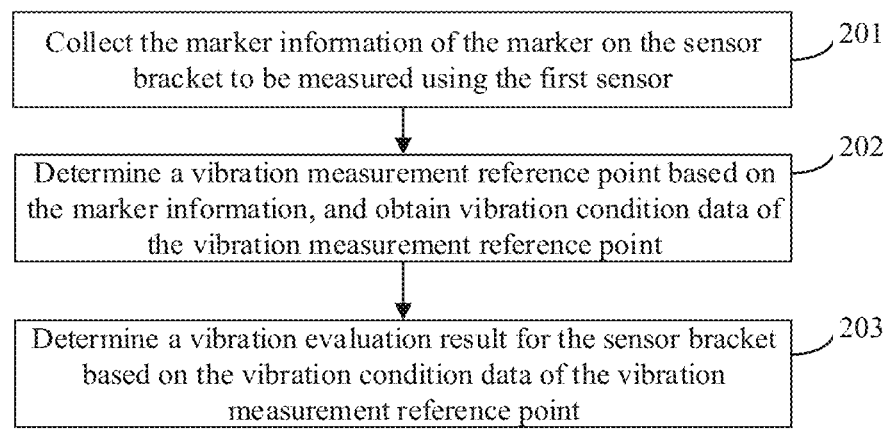
FIG. 2 is a flowchart illustrating a method for vibration measurement for a sensor bracket provided by an embodiment of the present disclosure.
Figure 3:
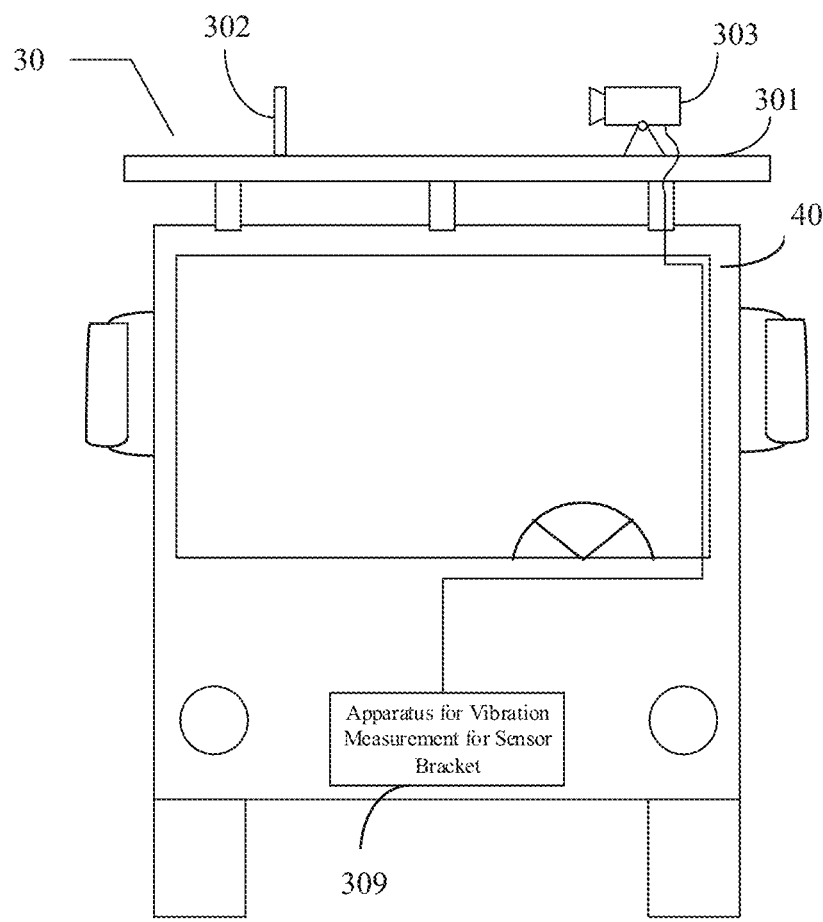
FIG. 3 is a schematic diagram showing a structure of a system for vibration measurement for a sensor bracket according to an embodiment of the present disclosure.

In order to overcome the above problem, as shown in FIG. 2, an embodiment of the present disclosure provides a method for vibration measurement for a sensor bracket, which is applied in a system 30 for vibration measurement for the sensor bracket as shown in FIG. 3. The system 30 for vibration measurement for the sensor bracket includes a sensor bracket 301 to be measured that is mounted on a movable device 40, a marker 302 on the sensor bracket 301 to be measured, and a first sensor 303 provided on the sensor bracket 301 to be measured for collecting marker information. In an embodiment, the movable device 40 may be a movable device such as a vehicle (e.g., an autonomous vehicle), a drone, a logistics robot, or the like.

The method for vibration measurement for the sensor bracket includes the following steps.

At step 201, the marker information of the marker on the sensor bracket to be measured is collected using the first sensor.

At step 202, a vibration measurement reference point is determined based on the marker information, and vibration condition data of the vibration measurement reference point is obtained.

At step 203, a vibration evaluation result for the sensor bracket is determined based on the vibration condition data of the vibration measurement reference point.

Figure 4:
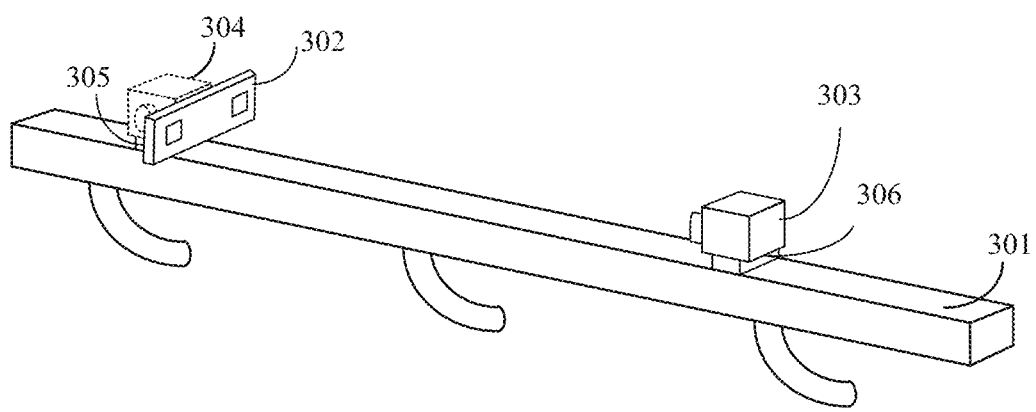
FIG. 4 is a first schematic diagram showing a part of a structure of a system for vibration measurement for a sensor bracket according to an embodiment of the present disclosure.

It is to be noted that, as shown in FIG. 4, the above sensor bracket 301 may be typically configured to have a binocular camera set mounted thereon. The binocular camera set includes two cameras 304. The sensor bracket 301 can have camera mounting positions (each including e.g., a mounting base, a mounting hole, etc., for mounting the cameras) on both sides where the two cameras 304 are to be mounted, respectively. The marker 302 can be provided at one 305 of the camera mounting positions, and the first sensor 303 can be provided at the other 306 of the camera mounting positions.

Figure 5:
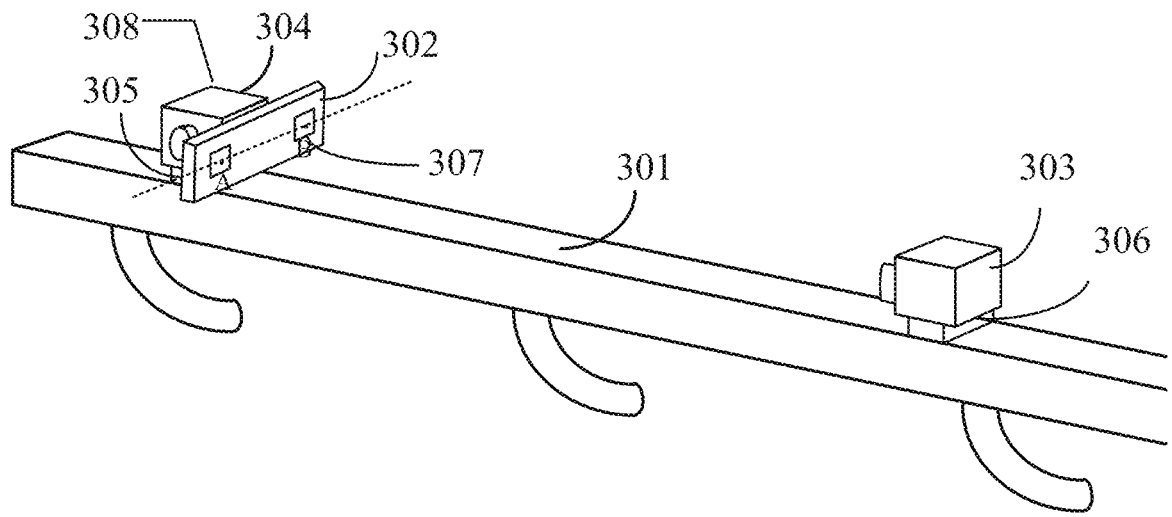
FIG. 5 is a second schematic diagram showing a part of a structure of a system for vibration measurement for a sensor bracket according to an embodiment of the present disclosure.

In addition, in an embodiment of the present disclosure, as shown in FIG. 5, the marker 302 can have a plate-shaped structure with a front surface and a rear surface. The front surface can have one or more sets of marks to be measured provided thereon (only one set is provided as shown in FIG. 5 as an example, but the present disclosure is not limited to this). Each set of marks to be measured may include two marks 307 to be measured, with an initial position of a line (line AB in FIG. 5) connecting respective centers of the two marks 307 to be measured being parallel to a plane on which the movable device is movable and perpendicular to a direction in which the sensor bracket 301 extends. A second sensor 308 can be mounted at the camera mounting position 305, and the rear surface can be fixedly connected to the second sensor 308. The second sensor 308 may be one of the cameras 304 in the above binocular camera set, such that the rear surface of the plate-shaped structure is fixedly connected to the camera 304. The first sensor 303 can be provided at the other camera mounting position 306, such that the obtained result corresponds to a relative movement between the two cameras 304 in the binocular camera set.

Figure 6:
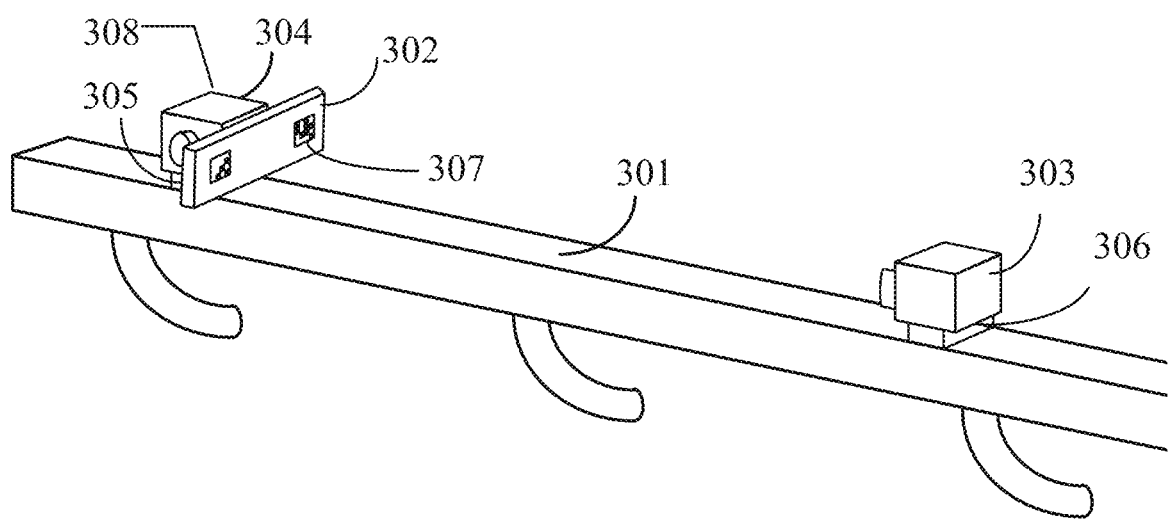
FIG. 6 is a third schematic diagram showing a part of a structure of a system for vibration measurement for a sensor bracket according to an embodiment of the present disclosure.

For example, as shown in FIG. 6, the plate-shaped structure can be a structure with a large mass, such as an iron plate, such that the plate-shaped structure will not be too light and, when the movable device 40 moves, the plate-shaped structure will not be affected by the wind to affect the vibration evaluation result for the sensor bracket. Each mark 307 to be measured may be a square ArUco code, and the first sensor 303 may be a vehicle-mounted camera.

Figure 7:
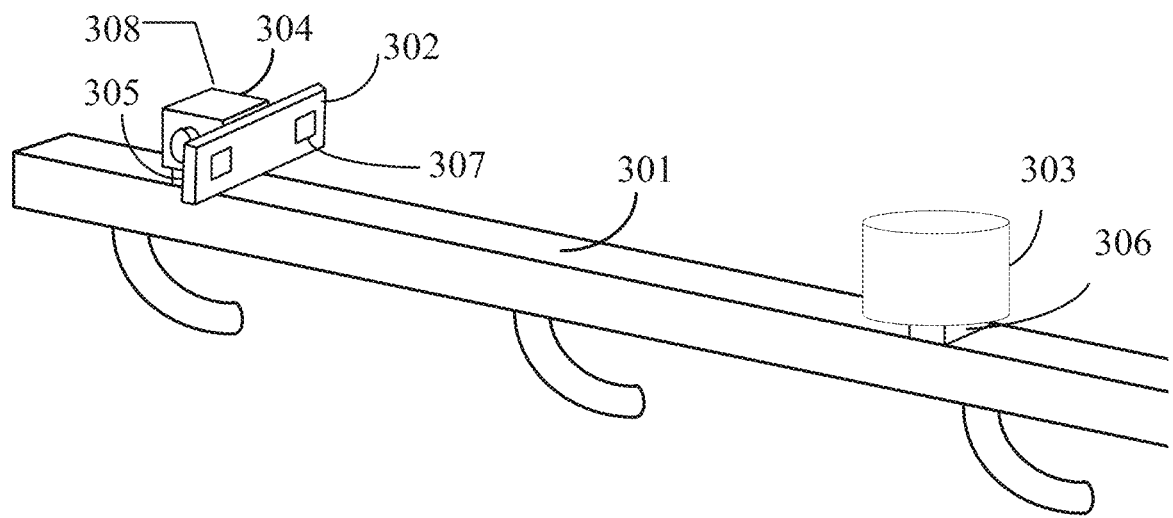
FIG. 7 is a fourth schematic diagram showing a part of a structure of a system for vibration measurement for a sensor bracket according to an embodiment of the present disclosure.

As another example, as shown in FIG. 7, a material of the plate-shaped structure has a laser reflection intensity different from that of a material of the mark to be measured. The plate-shaped structure may be a structure with a larger mass, such as an iron plate. The mark 307 to be measured can be a square sheet, e.g., a plastic square sheet, which is attached to the front surface of the plate-shaped structure. The first sensor 303 can be a vehicle-mounted laser radar. In this way, as the laser reflection intensity of the material of the plate-shaped structure is different from that of the mark to be measured, the vehicle-mounted laser radar can easily collect point cloud data of the square sheet.

In an embodiment of the present disclosure, in order to measure the vibration of the sensor bracket and simulate the influence of the movement of the movable device (such as movement of an autonomous vehicle) on the vibration of the sensor bracket, so as to better observe the vibration effect, for an autonomous vehicle as an example, the autonomous vehicle can move in normal road conditions, e.g., at a speed of 10 km/h or 20 km/h on a normal road, or at a speed of 10 km/h or 20 km/h when passing a speed bump.

Figure 8:
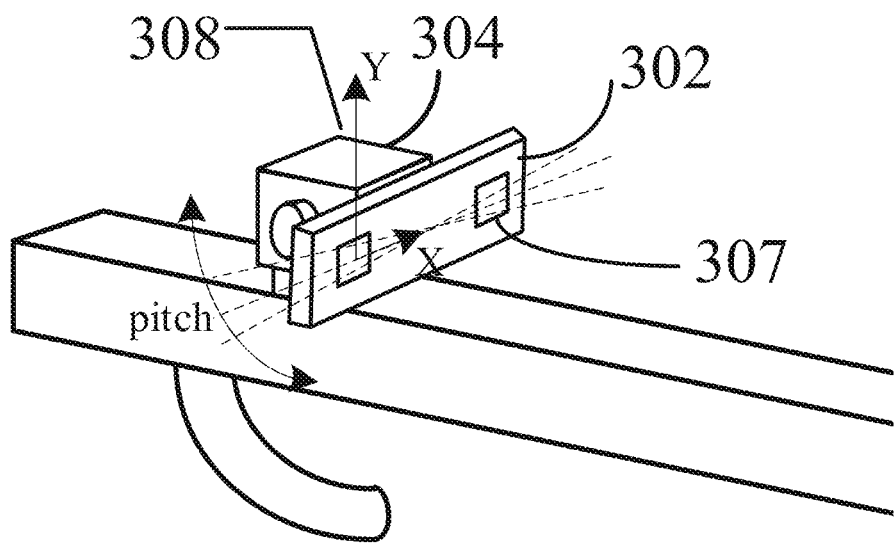
FIG. 8 is a schematic diagram showing an X-axis and a Y-axis of a mark to be measured and a pitch direction of the sensor bracket according to an embodiment of the present disclosure.

In addition, as shown in FIG. 8, when the movable device is an autonomous vehicle, the vibration of the sensor bracket 301 of interest may be mainly in the X-axis direction and the Y-axis direction of the mark 307 to be measured, and the pitch direction of the sensor bracket 301.

In this case, the above step 201 of collecting the marker information of the marker on the sensor bracket to be measured using the first sensor can be implemented as including: collecting each set of marks to be measured on the markers on the sensor bracket to be measured using the first sensor, and determining edge information of the two marks to be measured in each set of marks to be measured.

For example, when each mark to be measured is a square ArUco code and the first sensor is a vehicle-mounted camera, the operations of collecting each set of marks to be measured on the markers on the sensor bracket to be measured using the first sensor, and determining the edge information of the two marks to be measured in each set of marks to be measured can be implemented as including: collecting each set of square ArUco codes on the marker on the sensor bracket to be measured using the vehicle-mounted camera, and determining edge point positions of four corners of each square ArUco code in each set of square ArUco codes. When collecting each set of square ArUco codes on the markers on the sensor bracket to be measured using the vehicle-mounted camera, an aperture size and a focal length of the vehicle-mounted camera needs to be adjusted such that each set of square ArUco codes can be captured clearly. As there are errors in images collected by the vehicle-mounted camera, in order to determine the edge of the collected marker more accurately, an embodiment of the present disclosure uses ArUco codes in OpenCV (an open source computer vision library). OpenCV provides an algorithm for identifying coordinates of four edge points of an ArUco code, such that the edge point positions of the four corners of each square ArUco code in each set of square ArUco codes can be determined by the vehicle-mounted camera more accurately. The details of the process for identifying the ArUco code in OpenCV will be omitted here.

As another example, when each mark to be measured is a square sheet and the first sensor is a vehicle-mounted laser radar, the operations of collecting each set of marks to be measured on the markers on the sensor bracket to be measured using the first sensor, and determining the edge information of the two marks to be measured in each set of marks to be measured can be implemented as including: collecting point cloud data of each set of square sheets on the marker on the sensor bracket to be measured using the vehicle-mounted laser radar, and determining edge point positions of four corners of each square sheet in each set of square sheets based on the point cloud data of the set of square sheets. Unlike the vehicle-mounted camera, the point cloud data collected by the vehicle-mounted laser radar already contains coordinate positions of the respective points. Therefore, the square sheet may have a laser reflection intensity different from that of the material of the plate-shaped structure, in order to facilitate collecting of the edge point positions of the four corners of each square sheet using the vehicle-mounted laser radar.

The above step 202 of determining the vibration measurement reference point based on the marker information, and obtaining the vibration condition data of the vibration measurement reference point can be implemented as including: determining respective mark center points of the two marks to be measured in each set of marks to be measured based on the edge information of the two marks to be measured in the set of marks to be measured; and determining the vibration measurement reference point based on the respective mark center points of the two marks to be measured in each set of marks to be measured, and obtaining offset positions of the vibration measurement reference point at respective time points and pitches of the sensor bracket to be measured.

Figure 9:
FIG. 9 is a schematic diagram showing determining of a mark center point of a square ArUco code according to an embodiment of the present disclosure.

For example, when each mark to be measured is a square ArUco code, and the first sensor is a vehicle-mounted camera, the operation of determining the respective mark center points of the two marks to be measured in each set of marks to be measured based on the edge information of the two marks to be measured in the set of marks to be measured can be implemented as including: determining the mark center point of each square ArUco code in each set of square ArUco codes based on the edge point positions of the four corners of the square ArUco code. For example, as shown in FIG. 9, taking a set of square ArUco codes as an example, when the edge point positions of the four corners of the square ArUco code on the left of FIG. 9 and the edge point positions of the four corners of the square ArUco code on the right of FIG. 9 have been determined, the mark center point of each square ArUco code, namely point A and point B, can be determined directly based on geometric relations, and the positions of point A and point B can be determined accordingly.

The operations of determining the vibration measurement reference point based on the respective mark center points of the two marks to be measured in each set of marks to be measured, and obtaining the offset positions of the vibration measurement reference point at the respective time points and the pitches of the sensor bracket to be measured can be implemented as follows.

Figure 10:
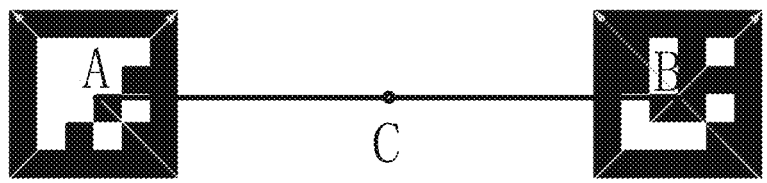
FIG. 10 is a schematic diagram showing determining of a vibration measurement reference point based on a midpoint corresponding to a set of square ArUco codes according to an embodiment of the present disclosure.
Figure 11:
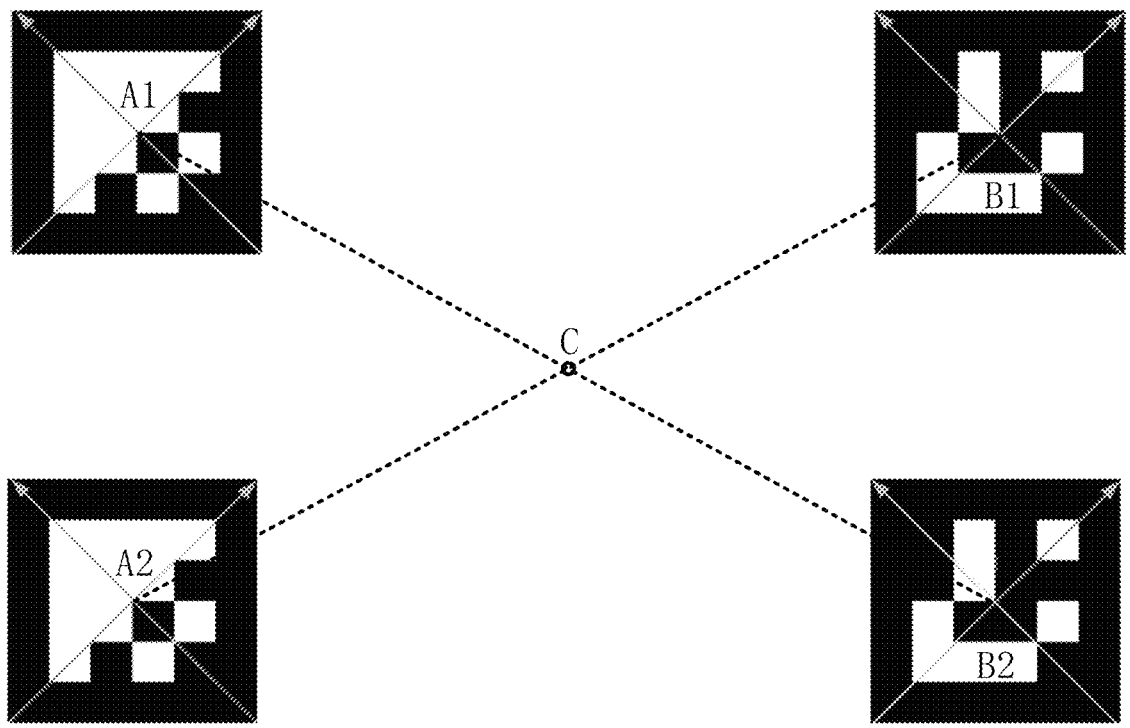
FIG. 11 is a schematic diagram showing determining of a vibration measurement reference point based on a midpoint corresponding to a plurality of sets of square ArUco codes according to an embodiment of the present disclosure.

A midpoint between the respective mark center points of the two square ArUco codes in each set of square ArUco codes can be obtained, and a vibration measurement reference point can be determined based on the midpoint corresponding to each set of square ArUco codes. For example, as shown in FIG. 10, taking a set of square ArUco codes as an example, after obtaining the mark center points of the square ArUco codes, namely point A and point B, the midpoint, point C, of point A and point B can be obtained in real time, as a vibration measurement reference point. As another example, as shown in FIG. 11, when there are a plurality sets of square ArUco codes (two sets of square ArUco codes in this example), after obtaining the mark center points of the square ArUco codes, namely point A1, point B1, point A2, and point B2, a geometric midpoint, point C, of A1, B1, A2, and B2 can be obtained (for example, A1, B1, A2, and B2 can form a rectangle, then the geometric midpoint is the center point of the rectangle) as the vibration measurement reference point. When the movable device 40 is static and is in a non-started state (for example, when the autonomous vehicle is off), the determined vibration measurement reference point is at its initial position.

The offset positions of the vibration measurement reference point at the respective time points can be determined, in real time, based on positions of the midpoint between the respective mark center points of the two square ArUco codes in each set of square ArUco codes at the respective time points. The initial position of the vibration measurement reference point can be obtained according to the method corresponding to FIG. 10 or FIG. 11, and then, the positions of the vibration measurement reference point at the respective time points can be determined in real time, and the offset positions at the respective time points can be determined.

Figure 12:
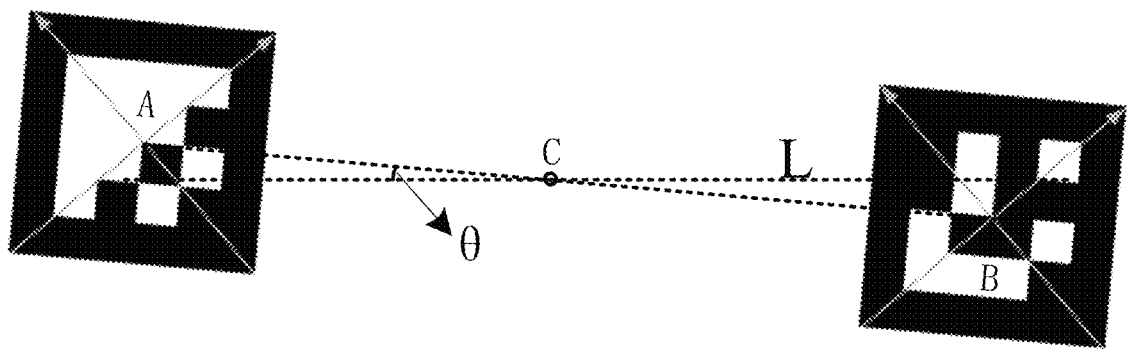
FIG. 12 is a schematic diagram showing determining of a pitch of a sensor bracket to be measured based on respective mark center points of a set of square ArUco codes according to an embodiment of the present disclosure.
Figure 13:
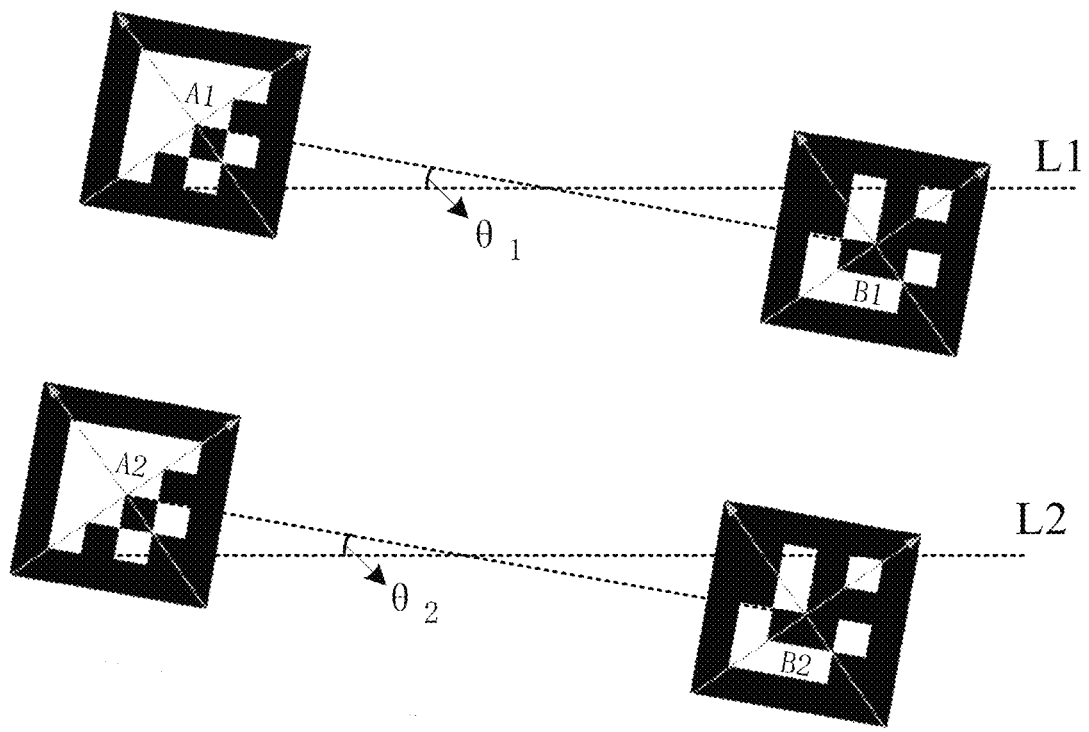
FIG. 13 is a schematic diagram showing determining of a pitch of a sensor bracket to be measured based on respective mark center points of a plurality of sets of square ArUco codes according to an embodiment of the present disclosure.

A deflection angle between a line connecting the respective mark center points of the two square ArUco codes in each set of square ArUco codes and the plane on which the movable device is movable can be obtained, and the pitches of the sensor bracket to be measured can be determined based on the deflection angle corresponding to each set of square ArUco codes. For example, as shown in FIG. 12, taking a set of square ArUco codes as an example, after obtaining the mark center points of the square ArUco codes, namely point A and point B, a deflection angle θ between a line connecting point A and point B and the plane on which the movable device is movable (for example, for an autonomous vehicle moving on a horizontal road surface, the plane on which the movable device is movable is the horizontal road surface, which is represented by a horizontal line L in FIG. 12) can be obtained. Thus, the deflection angle θ corresponding to the set of square ArUco codes can be determined as the pitch of the sensor bracket to be measured:

$$\theta = \arctan\left|\frac{(k_{AB} - k_L)}{(1 + k_L \cdot k_{AB})}\right|,$$

where $k_{AB}$ is the slope of the line connecting point A and point B, and $k_L$ is the slope of the horizontal line L. As another example, as shown in FIG. 13, when there are a plurality of sets of square ArUco codes (two sets of square ArUco codes in this example), after obtaining the mark center points of the square ArUco codes, namely point A1, point B1, point A2, and point B2, a deflection angle $\theta_1$ between a line connecting point A1 and point B1 and the plane on which the movable device is movable (for example, for an autonomous vehicle moving on a horizontal road surface, the plane on which the movable device is movable is the horizontal road surface, which is represented by a horizontal line L1 in FIG. 13) can be obtained as $$\theta_1 = \arctan\left|\frac{(k_{A1B1} - k_{L1})}{(1 + k_{L1} \cdot k_{A1B1})}\right|,$$

where $k_{A1B1}$ is the slope of the line connecting point A1 and point B1, and $k_{L1}$ is the slope of the horizontal line L1. In addition, a deflection angle $\theta_2$ between a line connecting point A2 and point B2 and the plane on which the movable device is movable (for example, for an autonomous vehicle moving on a horizontal road surface, the plane on which the movable device is movable is the horizontal road surface, which is represented by a horizontal line L2 in FIG. 13) can be obtained as $$\theta_2 = \arctan\left|\frac{(k_{A2B2} - k_{L2})}{(1 + k_{L2} \cdot k_{A2B2})}\right|,$$

where $k_{A2B2}$ is the slope of the line connecting point A2 and point B2, and $k_{L2}$ is the slope of the horizontal line L2. In this way, the pitch θ of the sensor bracket to be measured can be determined based on the deflection angles $\theta_1$ and $\theta_2$ corresponding to the two sets of square ArUco codes, respectively, as $$\theta = \frac{\theta_1 + \theta_2}{2}.$$

Here, if there are more sets of square ArUco codes on the plate-shaped structure, the deflection angle for each set of square ArUco codes can be obtained using the above approach, and finally the pitch θ of the sensor bracket to be measured can be determined by e.g., averaging the respective deflection angles corresponding to the sets of square ArUco codes.

Figure 14:
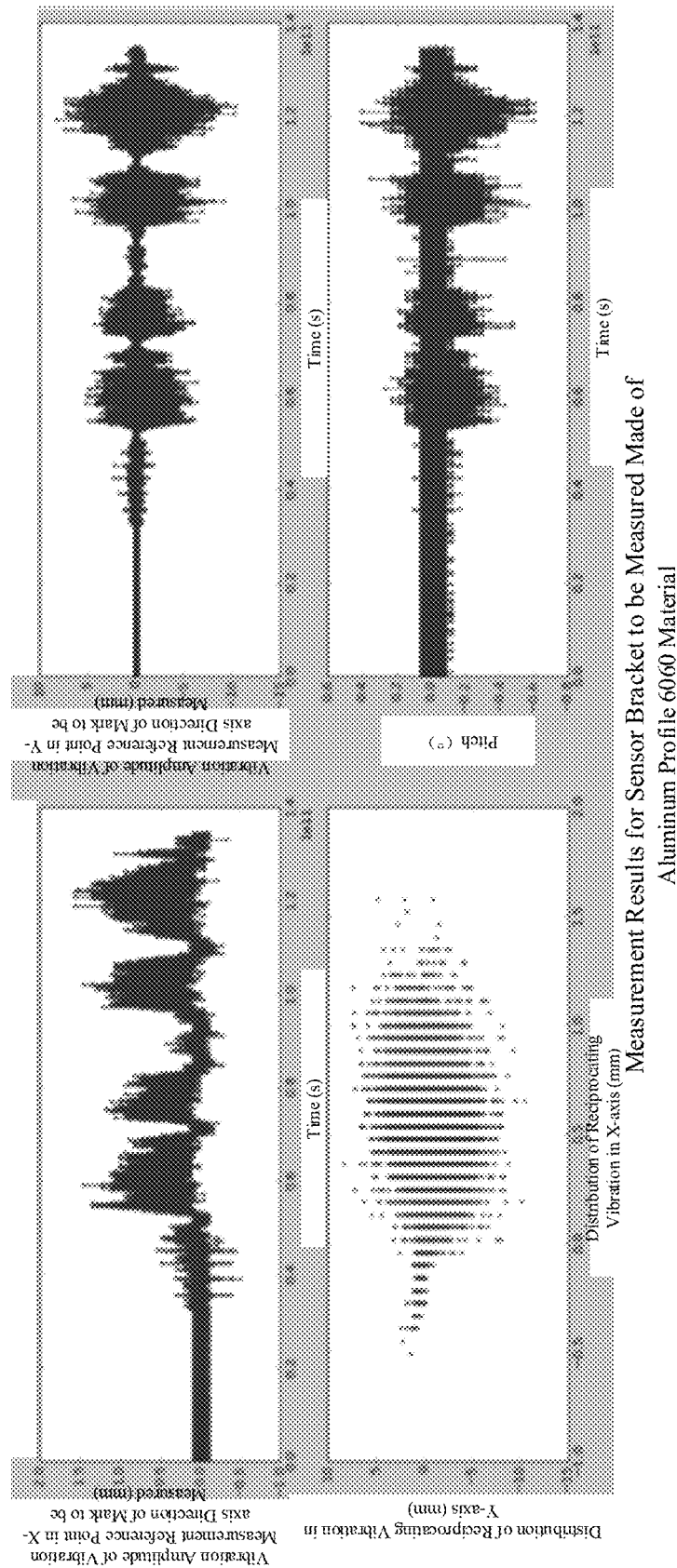
FIG. 14 is a schematic diagram showing a measurement result for a sensor bracket to be measured made of an Aluminum Profile 6060 material according to an embodiment of the present disclosure.

For example, as shown in FIG. 14, in an embodiment of the present disclosure, the sensor bracket to be measured made of an Aluminum Profile 6060 material (i.e., the material is 6060 aluminum alloy) is measured, and the result in FIG. 14 is obtained. In this case, the vibration amplitude in the X-axis direction of the vibration measurement reference point of the mark 307 to be measured can be obtained as having an offset of approximately −0.5 mm to 1.5 mm from the initial position, and the vibration amplitude in the Y-axis direction of the mark 307 to be measured can be obtained as having an offset between −10 mm and 10 mm from the initial position. The pitch direction of the sensor bracket 301 is between −0.6° and 0.5°.

Figure 15:
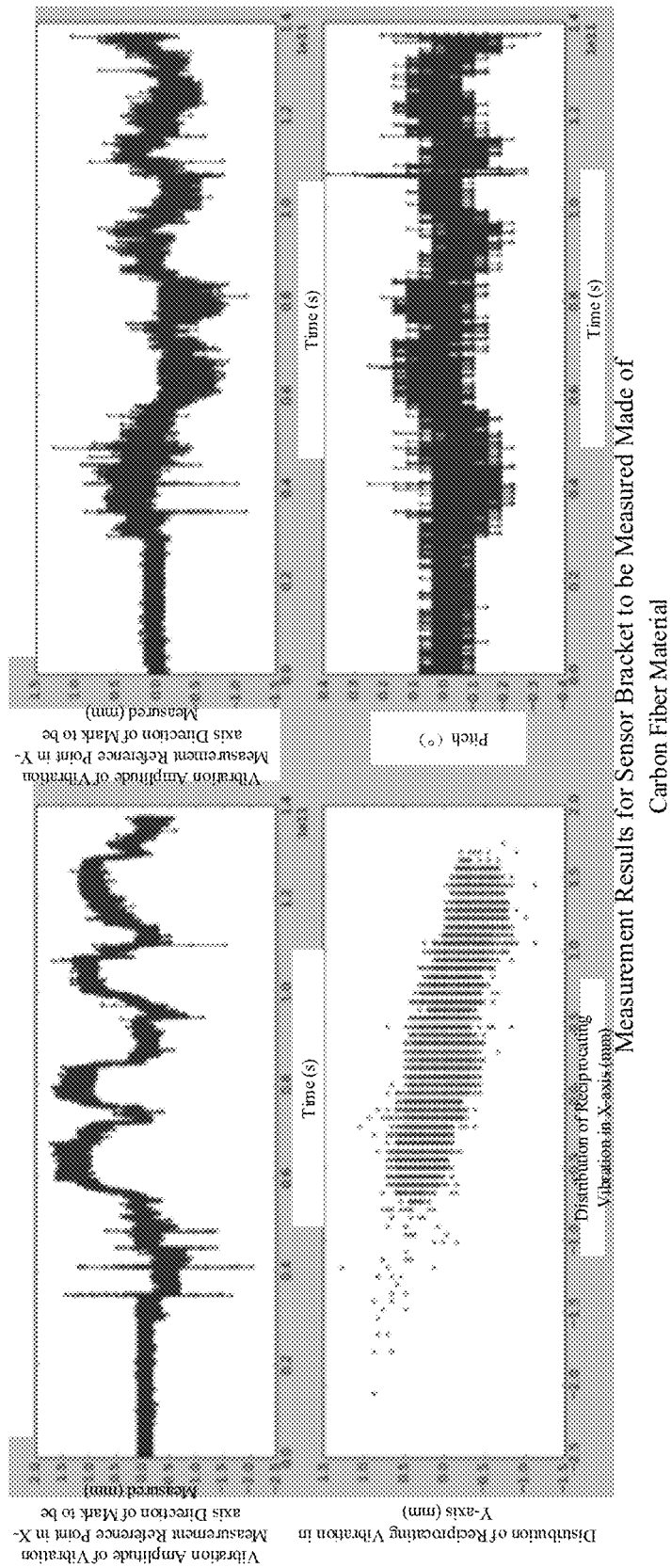
FIG. 15 is a schematic diagram showing a measurement result for a sensor bracket to be measured made of a carbon fiber material according to an embodiment of the present disclosure.

As another example, as shown in FIG. 15, in an embodiment of the present disclosure, a sensor bracket to be measured that is made of a carbon fiber material is measured, and the result in FIG. 15 is obtained. In this case, the vibration amplitude in the X-axis direction of the vibration measurement reference point of the mark 307 to be measured can be obtained as having an offset of approximately −2.0 mm to 1.9 mm from the initial position, and the vibration amplitude in the Y-axis direction of the mark 307 to be measured can be obtained as having an offset between −1.0 mm and 1.5 mm from the initial position. The pitch direction of the sensor bracket 301 is between −0.3° and 0.4°.

In this case, the above step 203 of determining the vibration evaluation result for the sensor bracket based on the vibration condition data of the vibration measurement reference point can be implemented as including: determining the vibration evaluation result for the sensor bracket based on the offset positions of the vibration measurement reference point at the respective time points, the pitches of the sensor bracket to be measured, a predetermined offset position range, and a predetermined pitch threshold.

The vibration evaluation result for the sensor bracket can be determined as passing an evaluation when each of the offset positions at the respective time points is within the predetermined offset position range, and each of the pitches at the respective time points is smaller than or equal to the predetermined pitch threshold, or the vibration evaluation result for the sensor bracket can be determined as failing the evaluation when any of the offset positions at the respective time points is outside the predetermined offset position range, or any of the pitches at the respective time points is larger than the predetermined pitch threshold. Here, the offset position range and the pitch threshold can be predetermined depending on stability requirements of the sensor bracket. For example, a vibration amplitude in the X-axis direction and a vibration amplitude in the Y-axis direction of the vibration measurement reference point of the sensor bracket typically used by the movable device and a pitch direction of the sensor bracket can be collected using the method according to the embodiment of the present disclosure, and can be used to determine the offset position range and the pitch threshold. For example, the offset position range can be set to be smaller than the vibration amplitude in the X-axis direction and the vibration amplitude in the Y-axis direction, and the pitch threshold can be set to be smaller than the pitch direction of the sensor bracket.

As another example, when each mark to be measured is a square sheet and the first sensor is a vehicle-mounted laser radar, the operation of determining the respective mark center points of the two marks to be measured in each set of marks to be measured based on the edge information of the two marks to be measured in the set of marks to be measured can be implemented as including: determining the mark center point of each square sheet in each sets of square sheets based on the edge point positions of the four corners of the square sheet. For details of the implementation, reference can be made to the above example corresponding to FIG. 9, except that the above square ArUco code is replaced with a square sheet that can be collected by the vehicle-mounted laser radar.

Then, the operations of determining the vibration measurement reference point based on the respective mark center points of the two marks to be measured in each set of marks to be measured, and obtaining the offset positions of the vibration measurement reference point at the respective time points and the pitches of the sensor bracket to be measured can be implemented as follows.

A midpoint between the respective mark center points of the two square sheets in each set of square sheets can be obtained, and a vibration measurement reference point can be determined based on the midpoint corresponding to each set of square sheets. For details of the implementation, reference can be made to the above example corresponding to FIG. 10 or FIG. 11, except that the above square ArUco code is replaced with a square sheet that can be collected by the vehicle-mounted laser radar.

The offset positions of the vibration measurement reference point at the respective time points can be determined in real time based on positions of the midpoint between the respective mark center points of the two square sheets in each set of square sheets at the respective time points. For example, the initial position of the vibration measurement reference point can be obtained using the above method corresponding to FIG. 10 or FIG. 11, and then the positions of the vibration measurement reference point at the respective time points can be determined in real time, so as to determine the offset positions at the respective time points.

A deflection angle between a line connecting the respective center points of the two square sheets in each set of square sheets and the plane on which the movable device is movable can be obtained, and the pitches of the sensor bracket to be measured based on the deflection angle corresponding to each set of square sheets can be determined. For details of the implementation, reference can be made to the above example corresponding to FIG. 12 or FIG. 13, except that the above square ArUco code is replaced with a square sheet that can be collected by the vehicle-mounted laser radar.

Similarly, when each mark to be measured is a square sheet and the first sensor is a vehicle-mounted laser radar, the sensor bracket to be measured that is made of an Aluminum Profile 6060 material and the sensor bracket to be measured that is made of a carbon fiber material can also be measured, and the results are similar to those shown in FIGS. 14 and 15, and details thereof will be omitted here.

In this case, the above step 203 of determining the vibration evaluation result for the sensor bracket based on the vibration condition data of the vibration measurement reference point can be implemented as including: determining the vibration evaluation result for the sensor bracket based on the offset positions of the vibration measurement reference point at the respective time points, the pitches of the sensor bracket to be measured, a predetermined offset position range, and a predetermined pitch threshold.

The vibration evaluation result for the sensor bracket can be determined as passing an evaluation when each of the offset positions at the respective time points is within the predetermined offset position range, and each of the pitches at the respective time points is smaller than or equal to the predetermined pitch threshold, or the vibration evaluation result for the sensor bracket can be determined as failing the evaluation when any of the offset positions at the respective time points is outside the predetermined offset position range, or any of the pitches at the respective time points is larger than the predetermined pitch threshold. Here, the offset position range and the pitch threshold can be predetermined depending on stability requirements of the sensor bracket. For example, a vibration amplitude in the X-axis direction and a vibration amplitude in the Y-axis direction of the vibration measurement reference point of the sensor bracket typically used by the movable device and a pitch direction of the sensor bracket can be collected using the method according to the embodiment of the present disclosure, and can be used to determine the offset position range and the pitch threshold. For example, the offset position range can be set to be smaller than the vibration amplitude in the X-axis direction and the vibration amplitude in the Y-axis direction, and the pitch threshold can be set to be smaller than the pitch direction of the sensor bracket.

Figure 16:
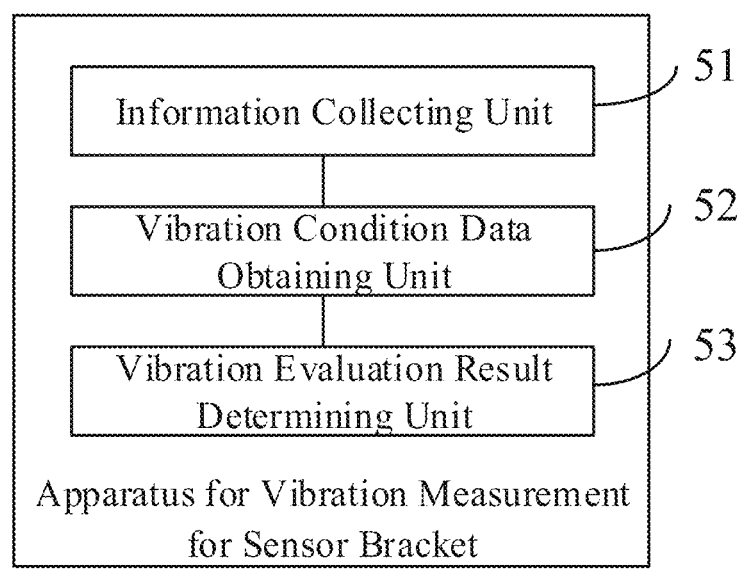
FIG. 16 is a schematic diagram showing a structure of an apparatus for vibration measurement for a sensor bracket according to an embodiment of the present disclosure.

In addition, according to an embodiment of the present disclosure, an apparatus for vibration measurement for a sensor bracket is provided, as shown in FIG. 16. The apparatus is applied in a system 30 for vibration measurement for the sensor bracket shown in FIG. 3. The system 30 includes a sensor bracket 301 to be measured that is mounted on a movable device 40, a marker 302 on the sensor bracket 301 to be measured, and a first sensor 303 provided on the sensor bracket 301 to be measured for collecting marker information. The apparatus 309 for vibration measurement for the sensor bracket can be communicatively connected to the first sensor 303.

The apparatus 309 for vibration measurement for the sensor bracket is configured to perform the above method for vibration measurement for the sensor bracket shown in FIG. 2. The apparatus 309 for vibration measurement for the sensor bracket may include the following units.

An information collecting unit 51 is configured to collect the marker information of the marker on the sensor bracket to be measured using the first sensor.

A vibration condition data obtaining unit 52 is configured to determine a vibration measurement reference point based on the marker information, and obtain vibration condition data of the vibration measurement reference point.

A vibration evaluation result determining unit 53 is configured to determine a vibration evaluation result for the sensor bracket based on the vibration condition data of the vibration measurement reference point.

It is to be noted that the apparatus 309 for vibration measurement for the sensor bracket may be a computer or a vehicle-mounted server.

In addition, as shown in FIG. 3 above, according to an embodiment of the present disclosure, a system 30 for vibration measurement for a sensor bracket is provided. The system includes an apparatus 309 for vibration measurement for the sensor bracket, the sensor bracket 301 to be measured that is mounted on a movable device 40, and a marker 302 on the sensor bracket 301 to be measured, and a first sensor 303 provided on the sensor bracket 301 to be measured for collecting marker information. The first sensor 303 is communicatively connected to the apparatus 309 for vibration measurement for the sensor bracket.

The apparatus 309 for vibration measurement for the sensor bracket is configured to: collect the marker information of the marker 302 on the sensor bracket 301 to be measured using the first sensor 303; determine a vibration measurement reference point based on the marker information, and obtain vibration condition data of the vibration measurement reference point; and determine a vibration evaluation result for the sensor bracket 301 based on the vibration condition data of the vibration measurement reference point.

In addition, as shown in FIG. 4 above, the sensor bracket 301 can be configured to have a binocular camera set mounted thereon. The binocular camera set includes two cameras 304. The sensor bracket 301 has camera mounting positions on both sides where the two cameras 304 are to be mounted, respectively. The marker 302 is provided at one 305 of the camera mounting positions, and the first sensor 303 is provided at the other 306 of the camera mounting positions.

In addition, as shown in FIG. 5 above, the marker 302 may have a plate-shaped structure with a front surface and a rear surface. The front surface may have one or more sets of marks to be measured provided thereon. Each set of marks to be measured may include two marks 307 to be measured, with an initial position of a line connecting respective centers of the two marks to be measured being parallel to a plane on which the movable device is movable and perpendicular to a direction in which the sensor bracket 301 extends. A second sensor 308 is mounted at the one camera mounting position 305, and the rear surface is fixedly connected to the second sensor 308.

The apparatus 309 for vibration measurement for the sensor bracket may be configured to: collect each set of marks to be measured on the markers on the sensor bracket 301 to be measured using the first sensor 303, and determine edge information of the two marks 307 to be measured in each set of marks to be measured.

The apparatus 309 for vibration measurement for the sensor bracket may be configured to: determine respective mark center points of the two marks 307 to be measured in each set of marks to be measured based on the edge information of the two marks to be measured in the set of marks to be measured; and determine the vibration measurement reference point based on the respective mark center points of the two marks to be measured in each set of marks to be measured, and obtain offset positions of the vibration measurement reference point at respective time points and pitches of the sensor bracket to be measured.

In addition, the apparatus 309 for vibration measurement for the sensor bracket may be configured to: determine the vibration evaluation result for the sensor bracket based on the offset positions of the vibration measurement reference point at the respective time points, the pitches of the sensor bracket to be measured, a predetermined offset position range, and a predetermined pitch threshold. The vibration evaluation result for the sensor bracket can be determined as passing an evaluation when each of the offset positions at the respective time points is within the predetermined offset position range, and each of the pitches at the respective time points is smaller than or equal to the predetermined pitch threshold, or the vibration evaluation result for the sensor bracket can be determined as failing the evaluation when any of the offset positions at the respective time points is outside the predetermined offset position range, or any of the pitches at the respective time points is larger than the predetermined pitch threshold.

In addition, as shown in FIG. 6 above, each mark 307 to be measured may be a square ArUco code, and the first sensor 303 may be a vehicle-mounted camera. The apparatus 309 for vibration measurement for the sensor bracket may be configured to: collect each set of square ArUco codes on the marker on the sensor bracket to be measured using the vehicle-mounted camera, and determining edge point positions of four corners of each square ArUco code in each set of square ArUco codes.

The apparatus 309 for vibration measurement for the sensor bracket may be configured to: determine the mark center point of each square ArUco code in each set of square ArUco codes based on the edge point positions of the four corners of the square ArUco code.

The apparatus 309 for vibration measurement for the sensor bracket may be configured to: obtain a midpoint between the respective mark center points of the two square ArUco codes in each set of square ArUco codes, and determine a vibration measurement reference point based on the midpoint corresponding to each set of square ArUco codes; determine, in real time, the offset positions of the vibration measurement reference point at the respective time points based on positions of the midpoint between the respective mark center points of the two square ArUco codes in each set of square ArUco codes at the respective time points; and obtain a deflection angle between a line connecting the respective mark center points of the two square ArUco codes in each set of square ArUco codes and the plane on which the movable device is movable, and determine the pitches of the sensor bracket to be measured based on the deflection angle corresponding to each set of square ArUco codes.

In addition, as shown in FIG. 7 above, a material of the plate-shaped structure may have a laser reflection intensity different from that of a material of the mark to be measured. The mark 307 to be measured may be a square sheet, and the first sensor 303 may be a vehicle-mounted laser radar. The apparatus 309 for vibration measurement for the sensor bracket may be configured to: collect point cloud data of each set of square sheets on the marker on the sensor bracket to be measured using the vehicle-mounted laser radar, and determine edge point positions of four corners of each square sheet in each set of square sheets based on the point cloud data of the set of square sheets.

The apparatus 309 for vibration measurement for the sensor bracket may be configured to: determine the mark center point of each square sheet in each sets of square sheets based on the edge point positions of the four corners of the square sheet.

The apparatus 309 for vibration measurement for the sensor bracket may be configured to: obtain a midpoint between the respective mark center points of the two square sheets in each set of square sheets, and determine a vibration measurement reference point based on the midpoint corresponding to each set of square sheets; determine the offset positions of the vibration measurement reference point at the respective time points based on positions of the midpoint between the respective mark center points of the two square sheets in each set of square sheets at the respective time points; and obtain a deflection angle between a line connecting the respective center points of the two square sheets in each set of square sheets and the plane on which the movable device is movable, and determine the pitches of the sensor bracket to be measured based on the deflection angle corresponding to each set of square sheets.

In addition, according to an embodiment of the present disclosure, a movable device is provided. The movable device may include the system 30 for vibration measurement for a sensor bracket corresponding to any of FIGS. 3 to 7. The movable device may be a movable device such as a vehicle (e.g., an autonomous vehicle), a drone, or a logistics robot. For details of its implementation, reference can be made to the embodiments of the system for vibration measurement for the sensor bracket corresponding to FIGS. 3 to 7, and description thereof will be omitted here.

In addition, according to an embodiment of the present disclosure, a computer readable storage medium is provided. The computer readable storage medium includes a program or instructions which, when executed on a computer, cause the computer to perform the method for vibration measurement for a sensor bracket corresponding to FIG. 2. For details of its implementation, reference can be made to the embodiment of the method for vibration measurement for the sensor bracket corresponding to FIG. 2, and description thereof will be omitted here.

In addition, according to an embodiment of the present disclosure, a computer program product is provided. The computer program product includes instructions. The computer program product, when executed on a computer, causes the computer to perform the method for vibration measurement for a sensor bracket corresponding to FIG. 2. For details of its implementation, reference can be made to the embodiment of the method for vibration measurement for the sensor bracket corresponding to FIG. 2, and description thereof will be omitted here.

In addition, according to an embodiment of the present disclosure, a chip system is provided. The chip system includes a processor. The processor is coupled to a memory storing program instructions which, when executed by the processor, cause the processor to perform the method for vibration measurement for a sensor bracket corresponding to FIG. 2. For details of its implementation, reference can be made to the embodiment of the method for vibration measurement for the sensor bracket corresponding to FIG. 2, and description thereof will be omitted here.

In addition, according to an embodiment of the present disclosure, a circuit system is provided. The circuit system includes a processing circuit configured to perform the method for vibration measurement for a sensor bracket corresponding to FIG. 2. For details of its implementation, reference can be made to the embodiment of the method for vibration measurement for the sensor bracket corresponding to FIG. 2, and description thereof will be omitted here.

In addition, according to an embodiment of the present disclosure, a computer server is provided. The computer server includes a memory and one or more processors communicatively connected to the memory. The memory stores instructions executable by the one or more processors, the instructions, when executed by the one or more processors, causing the one or more processors to perform the method for vibration measurement for a sensor bracket corresponding to FIG. 2. For details of its implementation, reference can be made to the embodiment of the method for vibration measurement for the sensor bracket corresponding to FIG. 2, and description thereof will be omitted here.

The embodiments of the present disclosure provide a method, an apparatus, and a system for vibration measurement for a sensor bracket as well as a movable device. A marker and a first sensor for collecting marker information are arranged on the sensor bracket to be measured. In this way, the marker information of the marker on the sensor bracket to be measured can be collected using the first sensor. A vibration measurement reference point can be determined based on the marker information, and vibration condition data of the vibration measurement reference point can be obtained. Then, a vibration evaluation result for the sensor bracket can be determined based on the vibration condition data of the vibration measurement reference point. It can be seen that the embodiments of the present disclosure can collect the marker information using the sensor, so as to determine the vibration evaluation result for the sensor bracket as an observation result for the sensor, which can reflect the vibration condition of the sensor bracket more intuitively. On the other hand, if the vibration condition of the sensor bracket is collected using an IMU, it requires two integrations of acceleration data obtained by the IMU, and the resulting noise would significantly affect the vibration evaluation result.

The present disclosure also provides the following examples.

Example 1. A method for vibration measurement for a sensor bracket, applied in a system for vibration measurement for the sensor bracket, the system comprising the sensor bracket to be measured that is mounted on a movable device, and a marker on the sensor bracket to be measured, and a first sensor provided on the sensor bracket to be measured for collecting marker information, the method comprising: collecting the marker information of the marker on the sensor bracket to be measured using the first sensor; determining a vibration measurement reference point based on the marker information, and obtaining vibration condition data of the vibration measurement reference point; and determining a vibration evaluation result for the sensor bracket based on the vibration condition data of the vibration measurement reference point.

Example 2. The method of Example 1, wherein the sensor bracket is configured to have a binocular camera set mounted thereon, the binocular camera set comprising two cameras; the sensor bracket has camera mounting positions on both sides where the two cameras are to be mounted, respectively; and the marker is provided at one of the camera mounting positions, and the first sensor is provided at the other of the camera mounting positions.

Example 3. The method of Example 2, wherein the marker has a plate-shaped structure with a front surface and a rear surface, and the front surface has one or more sets of marks to be measured provided thereon, each set of marks to be measured comprising two marks to be measured, with an initial position of a line connecting respective centers of the two marks to be measured being parallel to a plane on which the movable device is movable and perpendicular to a direction in which the sensor bracket extends; and a second sensor is mounted at the one camera mounting position, and the rear surface is fixedly connected to the second sensor.

Example 4. The method of Example 3, wherein said collecting the marker information of the marker on the sensor bracket to be measured using the first sensor comprises: collecting each set of marks to be measured on the markers on the sensor bracket to be measured using the first sensor, and determining edge information of the two marks to be measured in each set of marks to be measured.

Example 5. The method of Example 4, wherein said determining the vibration measurement reference point based on the marker information, and obtaining the vibration condition data of the vibration measurement reference point comprise: determining respective mark center points of the two marks to be measured in each set of marks to be measured based on the edge information of the two marks to be measured in the set of marks to be measured; and determining the vibration measurement reference point based on the respective mark center points of the two marks to be measured in each set of marks to be measured, and obtaining offset positions of the vibration measurement reference point at respective time points and pitches of the sensor bracket to be measured.

Example 6. The method of Example 5, wherein said determining the vibration evaluation result for the sensor bracket based on the vibration condition data of the vibration measurement reference point comprises: determining the vibration evaluation result for the sensor bracket based on the offset positions of the vibration measurement reference point at the respective time points, the pitches of the sensor bracket to be measured, a predetermined offset position range, and a predetermined pitch threshold, wherein the vibration evaluation result for the sensor bracket is determined as passing an evaluation when each of the offset positions at the respective time points is within the predetermined offset position range, and each of the pitches at the respective time points is smaller than or equal to the predetermined pitch threshold, or the vibration evaluation result for the sensor bracket is determined as failing the evaluation when any of the offset positions at the respective time points is outside the predetermined offset position range, or any of the pitches at the respective time points is larger than the predetermined pitch threshold.

Example 7. The method of Example 5, wherein each mark to be measured is a square ArUco code, and the first sensor is a vehicle-mounted camera, and said collecting each set of marks to be measured on the markers on the sensor bracket to be measured using the first sensor, and determining the edge information of the two marks to be measured in each set of marks to be measured comprise: collecting each set of square ArUco codes on the marker on the sensor bracket to be measured using the vehicle-mounted camera, and determining edge point positions of four corners of each square ArUco code in each set of square ArUco codes.

Example 8. The method of Example 7, wherein said determining the respective mark center points of the two marks to be measured in each set of marks to be measured based on the edge information of the two marks to be measured in the set of marks to be measured comprises: determining the mark center point of each square ArUco code in each set of square ArUco codes based on the edge point positions of the four corners of the square ArUco code.

Example 9. The method of Example 8, wherein said determining the vibration measurement reference point based on the respective mark center points of the two marks to be measured in each set of marks to be measured, and obtaining the offset positions of the vibration measurement reference point at the respective time points and the pitches of the sensor bracket to be measured comprise: obtaining a midpoint between the respective mark center points of the two square ArUco codes in each set of square ArUco codes, and determining a vibration measurement reference point based on the midpoint corresponding to each set of square ArUco codes; determining, in real time, the offset positions of the vibration measurement reference point at the respective time points based on positions of the midpoint between the respective mark center points of the two square ArUco codes in each set of square ArUco codes at the respective time points; and obtaining a deflection angle between a line connecting the respective mark center points of the two square ArUco codes in each set of square ArUco codes and the plane on which the movable device is movable, and determining the pitches of the sensor bracket to be measured based on the deflection angle corresponding to each set of square ArUco codes.

Example 10. The method of Example 5, wherein a material of the plate-shaped structure has a laser reflection intensity different from that of a material of the mark to be measured, each mark to be measured is a square sheet, and the first sensor is a vehicle-mounted laser radar, and said collecting each set of marks to be measured on the markers on the sensor bracket to be measured using the first sensor, and determining the edge information of the two marks to be measured in each set of marks to be measured comprise: collecting point cloud data of each set of square sheets on the marker on the sensor bracket to be measured using the vehicle-mounted laser radar, and determining edge point positions of four corners of each square sheet in each set of square sheets based on the point cloud data of the set of square sheets.

Example 11. The method of Example 10, wherein said determining the respective mark center points of the two marks to be measured in each set of marks to be measured based on the edge information of the two marks to be measured in the set of marks to be measured comprises: determining the mark center point of each square sheet in each sets of square sheets based on the edge point positions of the four corners of the square sheet.

Example 13. An apparatus for vibration measurement for a sensor bracket, applied in a system for vibration measurement for the sensor bracket, the system comprising the sensor bracket to be measured that is mounted on a movable device, and a marker on the sensor bracket to be measured, and a first sensor provided on the sensor bracket to be measured for collecting marker information, the apparatus is operative to perform the method vibration measurement for the sensor bracket according to any of Example 1-Example 12.

Example 14. The apparatus of Example 13, wherein the apparatus comprises a computer or a vehicle-mounted server.

Example 15. A system for vibration measurement for a sensor bracket, comprising an apparatus for vibration measurement for the sensor bracket, the sensor bracket to be measured that is mounted on a movable device, and a marker on the sensor bracket to be measured, and a first sensor provided on the sensor bracket to be measured for collecting marker information, the first sensor being communicatively connected to the apparatus for vibration measurement for the sensor bracket, wherein the apparatus for vibration measurement for the sensor bracket is configured to: collect the marker information of the marker on the sensor bracket to be measured using the first sensor; determine a vibration measurement reference point based on the marker information, and obtain vibration condition data of the vibration measurement reference point; and determine a vibration evaluation result for the sensor bracket based on the vibration condition data of the vibration measurement reference point.

Example 16. The system of Example 15, wherein the sensor bracket is configured to have a binocular camera set mounted thereon, the binocular camera set comprising two cameras; the sensor bracket has camera mounting positions on both sides where the two cameras are to be mounted, respectively; and the marker is provided at one of the camera mounting positions, and the first sensor is provided at the other of the camera mounting positions.

Example 17. The system of Example 16, wherein the marker has a plate-shaped structure with a front surface and a rear surface, and the front surface has one or more sets of marks to be measured provided thereon, each set of marks to be measured comprising two marks to be measured, with an initial position of a line connecting respective centers of the two marks to be measured being parallel to a plane on which the movable device is movable and perpendicular to a direction in which the sensor bracket extends; and a second sensor is mounted at the one camera mounting position, and the rear surface is fixedly connected to the second sensor.

Example 18. The system of Example 17, wherein the apparatus for vibration measurement for the sensor bracket is configured to: collect each set of marks to be measured on the markers on the sensor bracket to be measured using the first sensor, and determine edge information of the two marks to be measured in each set of marks to be measured.

Example 19. The system of Example 18, wherein the apparatus for vibration measurement for the sensor bracket is configured to: determine respective mark center points of the two marks to be measured in each set of marks to be measured based on the edge information of the two marks to be measured in the set of marks to be measured; and determine the vibration measurement reference point based on the respective mark center points of the two marks to be measured in each set of marks to be measured, and obtain offset positions of the vibration measurement reference point at respective time points and pitches of the sensor bracket to be measured.

Example 20. The system of Example 19, wherein the apparatus for vibration measurement for the sensor bracket is configured to: determine the vibration evaluation result for the sensor bracket based on the offset positions of the vibration measurement reference point at the respective time points, the pitches of the sensor bracket to be measured, a predetermined offset position range, and a predetermined pitch threshold, wherein the vibration evaluation result for the sensor bracket is determined as passing an evaluation when each of the offset positions at the respective time points is within the predetermined offset position range, and each of the pitches at the respective time points is smaller than or equal to the predetermined pitch threshold, or the vibration evaluation result for the sensor bracket is determined as failing the evaluation when any of the offset positions at the respective time points is outside the predetermined offset position range, or any of the pitches at the respective time points is larger than the predetermined pitch threshold.

Example 21. The system of Example 19, wherein each mark to be measured is a square ArUco code, and the first sensor is a vehicle-mounted camera, and the apparatus for vibration measurement for the sensor bracket is configured to: collect each set of square ArUco codes on the marker on the sensor bracket to be measured using the vehicle-mounted camera, and determining edge point positions of four corners of each square ArUco code in each set of square ArUco codes.

Example 22. The system of Example 21, wherein the apparatus for vibration measurement for the sensor bracket is configured to: determine the mark center point of each square ArUco code in each set of square ArUco codes based on the edge point positions of the four corners of the square ArUco code.

Example 23. The system of Example 22, wherein the apparatus for vibration measurement for the sensor bracket is configured to: obtain a midpoint between the respective mark center points of the two square ArUco codes in each set of square ArUco codes, and determine a vibration measurement reference point based on the midpoint corresponding to each set of square ArUco codes; determine, in real time, the offset positions of the vibration measurement reference point at the respective time points based on positions of the midpoint between the respective mark center points of the two square ArUco codes in each set of square ArUco codes at the respective time points; and obtain a deflection angle between a line connecting the respective mark center points of the two square ArUco codes in each set of square ArUco codes and the plane on which the movable device is movable, and determine the pitches of the sensor bracket to be measured based on the deflection angle corresponding to each set of square ArUco codes.

Example 24. The system of Example 19, wherein a material of the plate-shaped structure has a laser reflection intensity different from that of a material of the mark to be measured, the mark to be measured is a square sheet, and the first sensor is a vehicle-mounted laser radar, and the apparatus for vibration measurement for the sensor bracket is configured to: collect point cloud data of each set of square sheets on the marker on the sensor bracket to be measured using the vehicle-mounted laser radar, and determine edge point positions of four corners of each square sheet in each set of square sheets based on the point cloud data of the set of square sheets.

Example 25. The system of Example 24, wherein the apparatus for vibration measurement for the sensor bracket is configured to: determine the mark center point of each square sheet in each sets of square sheets based on the edge point positions of the four corners of the square sheet.

Example 26. The system of Example 25, wherein the apparatus for vibration measurement for the sensor bracket is configured to: obtain a midpoint between the respective mark center points of the two square sheets in each set of square sheets, and determine a vibration measurement reference point based on the midpoint corresponding to each set of square sheets; determine the offset positions of the vibration measurement reference point at the respective time points based on positions of the midpoint between the respective mark center points of the two square sheets in each set of square sheets at the respective time points; and obtain a deflection angle between a line connecting the respective center points of the two square sheets in each set of square sheets and the plane on which the movable device is movable, and determine the pitches of the sensor bracket to be measured based on the deflection angle corresponding to each set of square sheets.

Example 27. A movable device, comprising the system for vibration measurement for a sensor bracket according to any of Example 15-Example 26.

Example 28. A computer readable storage medium, comprising a program or instructions which, when executed on a computer, cause the computer to perform the method for vibration measurement for a sensor bracket according to any of A1-A12.

Example 29. A computer program product, comprising instructions, the computer program product, when executed on a computer, causing the computer to perform the method for vibration measurement for a sensor bracket according to any of Example 1-Example 12.

Example 30. A chip system, comprising a processor, the processor being coupled to a memory storing program instructions which, when executed by the processor, cause the processor to perform the method for vibration measurement for a sensor bracket according to any of Example 1-Example 12.

Example 31. A circuit system, comprising a processing circuit configured to perform the method for vibration measurement for a sensor bracket according to any of Example 1-Example 12.

Example 32. A computer server, comprising a memory and one or more processors communicatively connected to the memory, wherein the memory stores instructions executable by the one or more processors, the instructions, when executed by the one or more processors, causing the one or more processors to perform the method for vibration measurement for a sensor bracket according to any of Example 1-Example 12.

Example 33. An apparatus for vibration measurement for a sensor bracket, comprising: a memory; and one or more processors communicatively coupled to the memory, wherein the memory stores instructions that, when executed by the one or more processors, causing the apparatus to perform the method of Example 1.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage, CD-ROM, and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In the present disclosure, the principles and implementations of the present disclosure have been described with reference to specific embodiments. These embodiments are illustrative only, for facilitating understanding of the methods according to the present disclosure and core concepts thereof. Moreover, for those of ordinary skill in the art, modifications can be made to the specific implementations and application scenarios without departing from the principle of the present disclosure. In summary, the content of the specification should not be construed as limitation to the present disclosure.

What is claimed is:

1. A method for vibration measurement for a sensor bracket, applied in a system for vibration measurement for the sensor bracket, the system comprising the sensor bracket that is mounted on a movable device, and a marker on the sensor bracket, and a sensor provided on the sensor bracket, wherein the sensor bracket has camera mounting positions on both sides where two cameras are to be mounted, respectively; and the marker is provided at one of the camera mounting positions, and the sensor is provided at the other of the camera mounting positions, and wherein the method comprises:

collecting the marker information of the marker using the sensor;

determining a vibration measurement reference point based on the marker information, and obtaining vibration condition data of the vibration measurement reference point; and determining a vibration evaluation result for the sensor bracket based on the vibration condition data of the vibration measurement reference point.

2. The method of claim 1, wherein the sensor bracket is configured to have a binocular camera set mounted thereon, the binocular camera set comprising the two cameras to be mounted at the camera mounting positions, respectively.

3. The method of claim 2, wherein the marker has a plate-shaped structure with a front surface and a rear surface, and the front surface has one or more sets of marks to be measured provided thereon, each set of marks to be measured comprising two marks to be measured, with an initial position of a line connecting respective centers of the two marks to be measured being parallel to a plane on which the movable device is movable and perpendicular to a direction in which the sensor bracket extends; the sensor is a first sensor; and a second sensor is mounted at the one camera mounting position, and the rear surface is fixedly connected to the second sensor.

4. The method of claim 3, wherein said collecting the marker information of the marker using the first sensor comprises:

collecting each set of marks to be measured on the markers using the first sensor; and determining edge information of the two marks to be measured in each set of marks to be measured.

5. The method of claim 4, wherein said determining the vibration measurement reference point based on the marker information, and obtaining the vibration condition data of the vibration measurement reference point comprise:

determining respective mark center points of the two marks to be measured in each set of marks to be measured based on the edge information of the two marks to be measured in the set of marks to be measured; and determining the vibration measurement reference point based on the respective mark center points of the two marks to be measured in each set of marks to be measured, and obtaining offset positions of the vibration measurement reference point at respective time points and pitches of the sensor bracket.

6. The method of claim 5, wherein said determining the vibration evaluation result for the sensor bracket based on the vibration condition data of the vibration measurement reference point comprises:

determining the vibration evaluation result for the sensor bracket based on the offset positions of the vibration measurement reference point at the respective time points, the pitches of the sensor bracket, a predetermined offset position range, and a predetermined pitch threshold, wherein the vibration evaluation result for the sensor bracket is determined as passing an evaluation when each of the offset positions at the respective time points is within the predetermined offset position range, and each of the pitches at the respective time points is smaller than or equal to the predetermined pitch threshold, or the vibration evaluation result for the sensor bracket is determined as failing the evaluation when any of the offset positions at the respective time points is outside the predetermined offset position range, or any of the pitches at the respective time points is larger than the predetermined pitch threshold.

7. The method of claim 5, wherein each mark to be measured is a square ArUco code, and the first sensor is a vehicle-mounted camera, and said collecting each set of marks to be measured on the markers using the first sensor, and determining the edge information of the two marks to be measured in each set of marks to be measured comprise:

collecting each set of square ArUco codes on the marker using the vehicle-mounted camera; and determining edge point positions of four corners of each square ArUco code in each set of square ArUco codes.

8. The method of claim 7, wherein said determining the respective mark center points of the two marks to be measured in each set of marks to be measured based on the edge information of the two marks to be measured in the set of marks to be measured comprises:

determining the mark center point of each square ArUco code in each set of square ArUco codes based on the edge point positions of the four corners of the square ArUco code.

9. The method of claim 8, wherein said determining the vibration measurement reference point based on the respective mark center points of the two marks to be measured in each set of marks to be measured, and obtaining the offset positions of the vibration measurement reference point at the respective time points and the pitches of the sensor bracket comprise:

obtaining a midpoint between the respective mark center points of the two square ArUco codes in each set of square ArUco codes, and determining a vibration measurement reference point based on the midpoint corresponding to each set of square ArUco codes;

determining, in real time, the offset positions of the vibration measurement reference point at the respective time points based on positions of the midpoint between the respective mark center points of the two square ArUco codes in each set of square ArUco codes at the respective time points;

obtaining a deflection angle between a line connecting the respective mark center points of the two square ArUco codes in each set of square ArUco codes and the plane on which the movable device is movable; and determining the pitches of the sensor bracket based on the deflection angle corresponding to each set of square ArUco codes.

10. The method of claim 5, wherein a material of the plate-shaped structure has a laser reflection intensity different from that of a material of the mark to be measured, each mark to be measured is a square sheet, and the first sensor is a vehicle-mounted laser radar, and said collecting each set of marks to be measured on the markers using the first sensor, and determining the edge information of the two marks to be measured in each set of marks to be measured comprise:

collecting point cloud data of each set of square sheets on the marker using the vehicle-mounted laser radar; and determining edge point positions of four corners of each square sheet in each set of square sheets based on the point cloud data of the set of square sheets.

11. The method of claim 10, wherein said determining the respective mark center points of the two marks to be measured in each set of marks to be measured based on the edge information of the two marks to be measured in the set of marks to be measured comprises:
    determining the mark center point of each square sheet in each set of square sheets based on the edge point positions of the four corners of the square sheet.

12. The method of claim 11, wherein said determining the vibration measurement reference point based on the respective mark center points of the two marks to be measured in each set of marks to be measured, and obtaining the offset positions of the vibration measurement reference point at the respective time points and the pitches of the sensor bracket comprise:
    obtaining a midpoint between the respective mark center points of the two square sheets in each set of square sheets, and determining a vibration measurement reference point based on the midpoint corresponding to each set of square sheets;
    determining, in real time, the offset positions of the vibration measurement reference point at the respective time points based on positions of the midpoint between the respective mark center points of the two square sheets in each set of square sheets at the respective time points; and
    obtaining a deflection angle between a line connecting the respective center points of the two square sheets in each set of square sheets and the plane on which the movable device is movable, and determining the pitches of the sensor bracket based on the deflection angle corresponding to each set of square sheets.

13. An apparatus for vibration measurement for a sensor bracket, comprising:
    a memory; and
    one or more processors communicatively coupled to the memory, wherein
    the memory stores instructions that, when executed by the one or more processors, causing the apparatus to perform the method of claim 1.

14. A system for vibration measurement for a sensor bracket, comprising:
    an apparatus for vibration measurement for the sensor bracket;
    the sensor bracket mounted on a movable device, and
    a marker on the sensor bracket, and a sensor provided on the sensor bracket, the sensor being communicatively connected to the apparatus for vibration measurement for the sensor bracket, wherein the sensor bracket has camera mounting positions on both sides where the two cameras are to be mounted, respectively; and the marker is provided at one of the camera mounting positions, and the sensor is provided at the other of the camera mounting positions, and wherein
    the apparatus for vibration measurement for the sensor bracket is configured to:
    collect the marker information of the marker using the sensor;
    determine a vibration measurement reference point based on the marker information, and obtain vibration condition data of the vibration measurement reference point; and
    determine a vibration evaluation result for the sensor bracket based on the vibration condition data of the vibration measurement reference point.

15. The system of claim 14, wherein the sensor bracket is configured to have a binocular camera set mounted thereon, the binocular camera set comprising the two cameras to be mounted at the camera mounting positions, respectively.

16. The system of claim 15, wherein the marker has a plate-shaped structure with a front surface and a rear surface, and the front surface has one or more sets of marks to be measured provided thereon, each set of marks to be measured comprising two marks to be measured, with an initial position of a line connecting respective centers of the two marks to be measured being parallel to a plane on which the movable device is movable and perpendicular to a direction in which the sensor bracket extends; the sensor is a first sensor; and a second sensor is mounted at the one camera mounting position, and the rear surface is fixedly connected to the second sensor.

17. The system of claim 16, wherein the apparatus for vibration measurement for the sensor bracket is configured to:
    collect each set of marks to be measured on the markers using the first sensor; and
    determine edge information of the two marks to be measured in each set of marks to be measured.

18. The system of claim 17, wherein the apparatus for vibration measurement for the sensor bracket is configured to:
    determine respective mark center points of the two marks to be measured in each set of marks to be measured based on the edge information of the two marks to be measured in the set of marks to be measured;
    determine the vibration measurement reference point based on the respective mark center points of the two marks to be measured in each set of marks to be measured; and
    obtain offset positions of the vibration measurement reference point at respective time points and pitches of the sensor bracket.

19. A movable device, comprising the system for vibration measurement for a sensor bracket according to claim 14.

20. A non-transitory computer readable storage medium, comprising program instructions which, when executed by a processor of a computing device, cause the device to;
    collect marker information of a marker on a sensor bracket mounted on a movable device using a sensor provided on the sensor bracket, wherein the sensor bracket has camera mounting positions on both sides where two cameras are to be mounted, respectively; and the marker is provided at one of the camera mounting positions, and the sensor is provided at the other of the camera mounting positions;
    determine a vibration measurement reference point based on the marker information, and obtain vibration condition data of the vibration measurement reference point; and
    determine a vibration evaluation result for the sensor bracket based on the vibration condition data of the vibration measurement reference point.

* * * * *